United States Patent [19]

Reed et al.

[11] 4,107,365

[45] Aug. 15, 1978

[54] IMPROVEMENTS IN TEXTILE TRANSFERS

[75] Inventors: Kenneth James Reed; David Wellings Pointon, both of Wimbledon, England

[73] Assignee: E. T. Marler Limited, London, England

[21] Appl. No.: 816,836

[22] Filed: Jul. 18, 1977

Related U.S. Application Data

[63] Continuation of Ser. No. 668,053, Mar. 18, 1976, abandoned.

[30] Foreign Application Priority Data

Apr. 3, 1975 [GB] United Kingdom ............... 13792/75

[51] Int. Cl.[2] ........................... B32B 3/16; B32B 7/06

[52] U.S. Cl. .................................... 428/202; 156/240; 427/148; 427/261; 428/206; 428/343; 428/355; 428/913; 428/914

[58] Field of Search ............... 427/146, 148, 150, 261; 156/240; 428/199-204, 913, 914, 343, 355; 282/27.5

[56] References Cited

U.S. PATENT DOCUMENTS

| | | | |
|---|---|---|---|
| 2,746,893 | 5/1956 | Matthes | 428/202 |
| 3,359,127 | 12/1967 | Meyer et al. | 428/200 |
| 3,516,842 | 6/1970 | Klinker et al. | 428/914 X |
| 3,684,545 | 8/1972 | Worrall | 428/202 |

*Primary Examiner*—Thomas J. Herbert, Jr.
*Attorney, Agent, or Firm*—Edwin E. Greigg

[57] ABSTRACT

A method of printing textile and other surfaces and particularly relates to a transfer sheet comprising a flexible carrier sheet having a design in a drying ink surface which design is not transferable to a receptor material by the application of heat alone and a polymer layer applied over the design so that the application of heat to the transfer sheet causes the polymer layer to adhere to the receptor material so that the carrier sheet can be removed leaving the ink design transferred to the polymer which itself is totally transferred to the receptor material. The invention also includes a method of forming a transfer and a method of decorating a material, particularly a textile material, using the transfers and methods of the invention.

5 Claims, No Drawings

IMPROVEMENTS IN TEXTILE TRANSFERS

This is a continuation of application Ser. No. 668,053, filed Mar. 18, 1976, now abandoned.

This invention relates to improvements in transfers of the type comprising a transfer sheet carrying a printed design which is transferable from the transfer sheet to a textile or other material by application of heat and pressure. This invention relates to transfer sheets, processes of manufacture and use.

Textile transfers are known in which a design is printed on a carrier sheet of paper in an ink containing a subliming dyestuff which is transferable by heat to textile materials. The design is transferred in the vapour phase but the transfer process is very slow and it is limited to textiles composed entirely or substantially of synthetic fibres such as polyester, polyamide acrylic or cellulose acetate fibres, and requires heating the textile material to a high temperature of 180°-220° C which may damage the textile by causing shrinkage or loss of 'handle'. The lightfastness properties of such vapour phase dyestuffs are limited.

Textile transfer sheets are also known which are suitable for transfer to textiles composed of both natural and synthetic fibres, comprising a printed design in a thermoplastic ink on a silicone coated carrier sheet of high release properties. Transfer of the design is effected by heat and pressure while the transfer is in contact with the textile material. The ink becomes soft and tacky when hot and adheres to the textile, contact and adhesion being increased by application of pressure. Cooling causes the design to harden and the silicone coated carrier sheet may be peeled away because of its high release properties. This type of transfer suffers from the disadvantages of very poor print quality due to the difficult printing characteristics of suitable thermoplastic inks and the poor printability and high cost of carrier sheets with high release properties such as silicone coated vegetable parchment paper and other papers. The high release carrier sheets of the prior art give problems of unwanted mechanical transfer of the design during storage and handling of the transfer sheets, prior to heat transfer to the textile. A very thick ink film is required to obtain adequate adhesion to the textile and this limits the printing process to screen printing which can apply such thick films by using coarse screens, but poor print quality, very slow printing speeds and high costs result.

It is an object of the present invention to provide improved textile transfers which overcome the technical limitations and high costs of products of the prior art.

According to the present invention, there is provided a method for forming a transfer, which method comprises printing a design onto a flexible carrier sheet to produce a transferable design which does not undergo transfer by application of heat alone, and thereafter coating at least the surface of the design with a heat sensitive adhesive polymer whereby on locating said transfer with said polymer layer in contact with the receptor material, the application of heat to the transfer causes the polymer layer to adhere to the receptor material, so the carrier sheet can be peeled from the design to expose said design.

The invention also includes a transfer sheet comprising a flexible carrier sheet carrying a design in a dry ink on its surface which design is not transferable to a receptor material by the application of heat alone and a polymer layer applied over the design so that the application of heat to the transfer sheet causes the polymer layer to adhere to the receptor material so that the carrier sheet can be removed leaving the ink design transferred to the polymer which is itself totally transferred to the receptor material.

In another aspect of the invention there is provided a textile transfer which comprises a carrier sheet of high printability, a transferable design carried by said carrier sheet, a thermoplastic adhesive layer covering said design and arranged to reduce the adhesion between the carrier sheet and the design, whereby on locating the transfer with the adhesive layer juxtaposed a textile material, the application of heat and pressure produces adhesion between the thermoplastic adhesive layer and the textile material to secure the design thereto so that the carrier sheet can be peeled away to expose the design on the textile material.

The present invention further includes a method of applying a design to a textile material which method comprises applying said design to a carrier sheet, applying a layer of thermoplastic adhesive to the surface of the design so as to reduce adhesion between the design and the carrier sheet, placing the composite transfer sheet so formed with its adhesive layer in contact with a textile material, applying heat and pressure to the carrier sheet to cause adhesion between the thermoplastic layer and the textile material to secure the design thereto and peeling off the carrier sheet to expose the design.

Transfer sheets produced according to the present invention have the valuable advantage that they can be printed by any printing process such as lithographic, letterpress, gravure, screen, flexographic and electrostatic printing processes. Moreover, the printing process may be operated at the normal maximum speed for that process and such speeds are maintained in multicolour printing work whether on single-station or multi-station printing presses. Similarly, the normal speed of ink drying or setting for each printing process can be maintained in the production of transfer sheets of the present invention.

These advantages are obtained in the present invention partly by the preferred use of carrier sheets of high printability such as conventional machine coated art paper, and also by the use of suitable printing ink formulations.

It will be appreciated that special printing ink formulations are used in the present invention which respond to the adhesion reducing action of the overprint adhesive. The adhesion of many conventional printing inks to high printability carrier sheets which may be used in the present invention is not reduced by the overprint adhesive sufficiently to permit complete heat transfer of the ink design.

The adhesion of the special inks of the present invention to the high printability carrier sheets prior to application of the overprint adhesive, is also usually of such a high level that the ink designs are not transferable, e.g. by mechanical means alone.

This property is very valuable because printed transfer sheets may be stored and handled without special precautions and without causing damage to the printed design. In addition, the overprinting of the one ink by another in multi-colour printing work causes no problems such as unwanted picking of the first ink by the second.

The reduction of adhesion of the ink design by the overprint adhesive may be observed by a mechanical transfer test in which the ink design may be removed from the carrier sheet by mechanical means such as scrapping without damage to the surface of the carrier. The reduction of adhesion of the ink design therefore already exists in the transfer sheet prior to heat transfer. However, mechanical transfer is not essential to the present invention, it being sufficient that reduction of adhesion of the ink design is produced during the heat transfer operation.

Control of mechanical transfer properties is achieved by the selection of ink, overprint adhesive composition, and the conditions used to dry the adhesive. For example, if the overprint adhesive is dried at low temperature, e.g. 20°–50° C, the action of the overprint adhesive will be far lower than if the adhesive is dried at a high temperature of say 120° C.

The reduction of adhesion of the ink design according to the present invention may be obtained by a mechanism in which a liquid component of the adhesive penetrates and softens the ink layer and reduces the bonds of adhesion at the carrier sheet-design interface. This action may be accelerated by heat, particularly if the ink design is also thermoplastic and is itself therefore softened by heat, so that the use of heat in drying the adhesive will accelerate the action or as also will the use of heat in the heat transfer operation.

Printing inks suitable for use in the design may be those which dry substantially by a physical process such as evaporation, absorption or precipitation. Inks which dry by a chemical process such as oxidation and cross-linking are generally not suitable if the chemical drying process has proceeded to a substantial extent. Inks conventionally used for lithographic and letterpress printing dry by oxidation and cross-linking and consequently these inks are generally unsuitable for use in the present invention in that incomplete transfer will occur. Special ink compositions are required and suitable ink compositions may be readily formulated for all the printing processes which allow almost complete, or complete, transfer.

Because of the heat accelerating offset referred to, the use of inks based on thermoplastic compositions which are softened by heat will give a particularly pronounced reduction of adhesion. The adhesion between ink and adhesive must also be good.

If only a small reduction in adhesion is achieved, the transfer of the ink design in the heat transfer operation will only be partial, the remainder of the ink film will remain adhering to the carrier sheet. Consequently, the reduction of adhesive should be sufficient to ensure that a considerable proportion of the ink design is transferred and it is an advantage if substantially all the ink design is transferred integral with the adhesive since this provides maximum economy and an accurate control of colour of the textile which will match the colour of the printed carrier sheet, at least when the textile is a white material.

Electrostatic printing using inks composed of thermoplastic powders containing colouring matter as in xerographic printing, are suitable for use in the present invention since ink setting is obtained by the physical process of cooling and the inks are softenable by suitable liquids and are, of course, thermoplastic.

Reference in the present invention to printed designs or ink designs should also be read to include designs produced by drawing or painting methods provided the required criteria for the composition of the drawing or painting material are met. Similarly designs produced by photographic means, in addition to electrostatic printing, will also be suitable for use in the present invention provided our criteria for the image producing material are met.

It is a further feature of the present invention that the production of a heat transferable design by means of an overprint adhesive, does not suffer from problems caused by mis-register of adhesive and ink design.

Perfect register in commercial printing is impractical and in practice the overprint adhesive will either overlap or underlap the design, or both types of mis-register will occur together on different portions of the design. Overlap mis-register would cause the overlap portion of the adhesive to be directly printed on the carrier sheet and this would bond the carrier sheet to the textile material during heat transfer unless the overlap adhesive had transfer properties.

Underlap mis-register would cause that part of the design not covered by adhesive to remain adhering to the carrier sheet during heat transfer and when the carrier sheet and textile material are separated, tearing of the design can occur.

In one aspect of the present invention, a thermoplastic ink or coating composition may be printed or coated on a carrier sheet, which latter may be a high printability carrier sheet, and after heating, the composition produces a dry, coherent layer of film readily peeled from the carrier sheet. The reduction of adhesion of the thermoplastic composition to the carrier sheet may be achieved by the use of a liquid component in the composition which exudes into the interface between the design and carrier sheet and acts as an adhesion reducing agent.

Consequently, the use of an exuding liquid component in the overprint adhesive of the present invention, provides an adhesive which is transferable in the overlap regions.

Thus it will be appreciated that it is possible to obtain both effects simultaneously namely transfer of the ink design and transfer of the overlap adhesive by a combination of liquid components in the overprint adhesive.

The liquid component producing reduction of ink design adhesion is believed to achieve its effect by penetrating the ink layer and acting at the carrier sheet interface. The adhesion reducing action may be accompanied by a considerable softening action on the ink film so that during transfer using an underlap adhesive a precise shear of the softened ink design occurs around the edges of the underlap adhesive and only the design not covered with adhesive remains adhering to the carrier sheet.

It is therefore a feature of the present invention that a transfer sheet of the type described may be readily produced in which heat transfer of the ink design to a textile material may be achieved by an overprint adhesive which may overlap or underlap the ink design, and only that part of the ink design covered with adhesive will transfer.

The adhesives polymer layer of the present invention hereinafter referred to as "overprint adhesive" may be clear or coloured. A clear adhesive overlapping the ink design is almost invisible in the overlap regions after transfer. A white adhesive maintains the intensity or clarity of the ink design when the transfer is applied to a coloured textile. Coloured adhesives may be used to give special effects.

Reference in the present invention to a design, should be read to include a single design or a collection of related or non-related designs on a transfer sheet and the latter may be produced or used as an individual sheet or a continuous web.

Overprint adhesives are compositions which contain a thermoplastic polymer which is converted to a highly viscous adhesive state at heat transfer temperature. It is also possible for the adhesive to subsequently cross-link at heat transfer temperature and to become thermoset and heat resistant. The overprint adhesive must also contain a considerable quantity of liquid component to reduce adhesion of the ink design and an overlap adhesive must also contain an exuding liquid to reduce adhesion to the carrier sheet.

Finally, the overprint adhesive must dry or set after printing over the ink designs so that the transfer sheets may be stored and handled.

Suitable overprint adhesive compositions for use in the present invention are vinyl plastisols such as polyvinyl chloride-acetate copolymer powders dispersed in a liquid plasticiser. The adhesive may also contain volatile solvents or water which are evaporated during the drying of the adhesive.

A suitable vinyl plastisol may contain a cross-linking agent, such as a cross-linking methacrylate, so that during heat transfer, thermoplastic tacky adhesion first occurs and as heating is prolonged or the temperature increased, the adhesive cross-links and becomes non-tacky and heat-resistant. This has the advantage of rendering the transferred design re-ironable and unaffected by dry cleaning solvents. The adhesion to the textile and wash fastness may also be increased.

For the purposes of the present invention, liquid plasticisers may be classified into three main groups.

1. Liquids of high activity: these are polar materials such as tritolyl phosphate, butylbenzyl phthalate, dibutyl phthalate, cyclohexyl phthalate and dioctyl phthalate.
2. Liquids of medium activity: these have a high ratio of non-polar to polar groups such as dioctyl esters of adipic, sebacic and azelaic acids.
3. Liquids of low activity: these are mainly nonpolar such as epoxidized soya bean oil, castor oil and hydrocarbon oils.

These liquids are all of low volatility so that their effect is not lost by evaporation during storage of the transfer sheets.

The liquids of high and medium activity have a powerful adhesion reducing action on ink designs. Medium activity liquids are preferred for an overlapping adhesive because the liquid adhesive after printing may be set to a dry condition by heat without causing high adhesion to the carrier sheet.

The inclusion of low activity liquid in the plastisol at a relatively high concentration causes the liquid to exude from the adhesive into the carrier sheet and reduce adhesion of the overlap adhesive, however, the low activity liquids have little or no adhesion reducing action on the ink designs. Generally, a concentration of low activity plasticiser of over 5 parts per 100 parts of polymer will exude from the film and for this reason such liquids are conventionally not used at concentrations up to 5% by weight.

To reduce ink design adhesion and simultaneously provide transfer of the overlap adhesive, a low activity liquid in sufficient concentration to exude and a medium activity liquid are used in conjunction.

A thermoplastic adhesive formulated on this principle can be overprinted, or even coated, over the ink design and may be set by a brief heating cycle which raises the temperature to 120° C.

A printed ink design, coated or overprinted with plastisol adhesive can be heat transferred without setting the adhesive i.e. with a wet adhesive. This is useful when it is not required to store the transfer sheets prior to transfer. For example the adhesive may be coated over the pre-printed carrier sheet simultaneously laminated to the textile and the laminate heated to 180° C to cause transfer and the carrier sheet peeled away. When using a wet adhesive, very low pressure may be used for lamination to the textile. Heating may also be carried out by using hot air or infrared and little or no pressure is required during the heating operation.

Wet adhesive lamination is particularly useful for transfer to very rough, irregular or textured surfaces since adequate contact is obtained.

The adhesive thickness that may be used in the present invention depends on the absorbancy and surface roughness of the textile or other receiving surface, and on the pressure applied in the heat transfer operation. Normally a dry adhesive thickness of 15 – 30 micrometers is used for textiles under a pressure of 0.03 – 0.3 $kg/cm^2$ in the heat transfer operation. However, if a high pressure of 3.5 $kg/cm^2$ or more is used, adhesive thickness may be reduced to 5 – 10 micrometers and the textile with the applied transfer will retain a natural 'handle' and the porosity of the textile may also be retained since the very thin adhesive flows round the individual fibres rather than forming a continuous layer over the surface of the textile.

Carrier sheets may be papers which are coated, calendered, glazed, chemically treated, heavily sized or which use highly beaten pulp to reduce the fibrous properties to prevent penetration of printing ink into the fibres.

Preferred papers are high printability machine coated art papers in which china clay, calcium carbonate or other white pigment is dispersed in a binder of casein, starch derivative or polyvinyl acetate emulsion or the like is applied as a thin coating to paper to provide a surface with high pick resistance and controlled oil absorption to give a high printability result. A particularly suitable coated art paper is produced by cast-coating in which the coating is dried in contact with a polished drum.

Carrier sheets coated or impregnated with a special release agent such as silicone or 'quilon' (a Werner chrome complex with long chain fatty acid) may also be used but these are generally unnecessary and have disadvantages of cost and may give poor print quality.

Transparent papers, such as parchmentised, glassine and tracing papers, allow the printed design to be seen through the carrier sheet which is useful when the adhesive is white or coloured and is relatively opaque.

The surface finish of the paper may be gloss or matt and the transferred design will have a similar surface finish.

Inks may be formulated using a wide range of polymers for the ink vehicle provided the adhesion to the carrier sheet is reduced by the action of specific liquids incorporated in the overprint adhesive. Ink polymers are preferably also thermoplastic so that they become soft or even have a known melt viscosity at selected temperatures so that the action of the adhesion reducing liquid is accelerated by heat during drying of the adhesive or during heat transfer, or both.

Suitable polymers are polyvinyl chloride, polyvinyl chloride-acetate copolymer, polyvinyl acetate, ketone resins such as cyclohexanone-formaldehyde, hydantoin resins, phenolic resins, hydrocarbon resins, rosin derivatives such as pentaenythritol ester of rosin and maleic resins, polystyrene, acrylic, polyamide and polyurethane polymers.

Paste inks for lithographic and letterpress printing are produced without drying oils or with only a proportion of drying oil, insufficient to cause loss of transfer properties. A suitable ink varnish is produced by dissolving or dispersing the ink polymer, such as a rosin derivative, ketone resin, phenolic resin or hydrocarbon resin, in a high boiling aliphatic hydrocarbon having G.pt.250°-270° C. Pigments or dyes are dispersed in this varnish and various minor additives are included to give fine control of the printing properties.

The ink may be set by evaporation after printing and this can be accelerated by application of heat as in conventional heat-set printing processes, or by penetration of the solvent into the carrier sheet. Set-off is reduced by application of set-off spray since this has no harmful effect on the transfer properties.

Screen, gravure and flexographic printing inks may be produced using polyvinyl chloride-acetate copolymer, dissolved in suitable solvents to provide a varnish in which the pigments or dyes are dispersed. The ink vehicle may contain a proportion of plasticiser.

The dry printing ink should not be highly cross-linked prior to transfer otherwise transfer properties are substantially or totally destroyed. A large proportion of drying oils, or drying oil resins, or the incorporation of metallic driers in the oil, would give an unacceptable leve of cross-linking.

However, a latent cross-linking agent may be incorporated in the ink which causes cross-linking due to the temperature and time of heat transfer. For example, an ink based on an epoxy polymer may contain an amine adduct which only cross-links at 160° C. Dioctyl sebacate is suitable as an adhesion reducing liquid for use in this ink.

Heat transfer to textile materials of the transfer sheets of the present invention may be carried out using a platen press in which an upper platen electrically heated is applied under pressure to the textile material placed on the transfer sheet on the lower platen. A pad of silicone rubber may be placed under the transfer sheet to distribute pressure uniformly.

Fast reel to reel heat transfer using a continuous transfer sheet web and a continuous web of textile material can be carried out by feeding the two webs onto a large drum heated internally electrically or by heat exchange fluid, and pressure is applied by a heat resisting textile blanket tensioned around the drum.

The transfer sheets as described may have adhesion to many other sheet materials in addition to textiles. For example, excellent adhesion can be obtained on paper, paper-board, wood such as chipboard, hardboard, plastics, plastic laminates and metal sheets. Adhesion to sheet materials with a rough or irregular surface is obtained by using a thick layer of adhesive, high laminating pressure or by using wet-adhesive lamination as described. Thick sheet materials can be preheated to assist transfer. Consequently the decoration of many types of sheet material is possible by the printed transfer sheets of the present invention.

Heat transfers may also be applied by means of a domestic iron.

Following is a description by way of example only of methods of carrying the invention into effect.

EXAMPLE 1

A red lithographic ink of the following composition is printed onto a carrier sheet of blade coated art paper and the ink set by evaporation with hot air and the printing is treated with anti-set off spray powder to give a printed sheet with good handling properties and very high print quality.

| | |
|---|---|
| Red monoazo pigment | 21.6 |
| Talc | 2.7 |
| Alkyl amomonium montmorrilonite | 3.3 |
| Pentaerythritol ester of modified rosin | 26.8 |
| Aliphatic Hydrocarbon b.pt 260/290° C | 40.2 |
| Non Drying Oil 30-40 poises | 5.4 |
| | 100.0 |

The following thermoplastic adhesive, which transfers in the overlap region is overprinted by screen printing on the ink designs with a 2mm overlap, using a screen with 49 mesh/cm and is set at 120° C for 30 seconds.

| | |
|---|---|
| Fine particle size polyvinyl-chloride powder K value 66-68 | 40.0 |
| Dioctyl phtalate | 24.0 |
| Epoxidised soya bean oil | 17.0 |
| Dioctyl Azelate | 9.0 |
| Calcium Stearate | 8.0 |
| Ca/Zn Stabiliser | 2.0 |
| | 100.0 |

Transfer to knitted cotton fabric is carried out in aplaten press at 180° C for 15 seconds using pressure. The carrier sheet is peeled from the warm or cold fabric leaving the ink design 95% transferred with the adhesive. The transfer has high adhesion to the textile and resists repeated washing in water.

EXAMPLE 2

A orange screen printing ink of the following composition is printed onto cast-coated paper of 90 gsm through a screen of 100 mesh/cm and dried by evaporation in air jects at 40° C for 20 seconds.

| | |
|---|---|
| 30% Polyvinylchloride-acetate copolymer in methyl cyclohexanone | 64.00 |
| 25% Polymethacrylate ester in isopropylethyleneglycolether acetate | 15.25 |
| Dioctyl phtalate | 8.00 |
| Benzidine Orange pigment | 3.75 |
| Titanium dioxide pigment | 9.00 |
| | 100.00 |

The ink design is overprinted with a white thermoplastic adhesive using a screen with 24 mesh/cm. This adhesive is then dried at 120° C for a minimum of 30 seconds.

| | |
|---|---|
| Polyvinyl chloride polymer powder K value 68-72 and particle size less than 60 microns | 24.0 |
| Dioctyl phtalate | 13.0 |
| Dioctyl sebacate | 15.0 |

-continued

| | |
|---|---|
| Epoxidised soya bean oil | 10.0 |
| Titanium dioxide | 12.0 |
| Calcium stearate | 0.5 |
| Ca/Zn stabiliser | 1.5 |

Transfer to a blue polyester textile was carried out in a platen press as in Example 1.

EXAMPLE 3

A design is formed by electrostatic printing on a carrier sheet of cast-coated paper of 85 gsm using an electrostatic powder containing finely divided particles of thermoplastic polymer coloured with carbon black. The electrostatic image in black powder is adhered to the paper by heat which softens the black powder and setting is achieved by cooling the sheet.

The clear thermoplastic overprint adhesive of Example 1 is applied over the electrostatic design by screen printing using a screen with 24 mesh/cm, and the adhesive is set by heating to 120° C for 15 seconds. The transfer sheet is placed over a blue single knit polyester jersey textile material in a platen press heated to 180° C and pressure applied for 15 seconds using a silicone rubber pad beneath the textile to distribute pressure uniformly. The press is opened the textile removed and the carrier sheet is peeled away while it is warm at about 40°-50° C. The black design on a white background is perfectly transferred to the textile with excellent adhesion and is stretchable without losing adhesion or cracking. This applied transfer is satisfactorily resistant to repeated washing in warm water and detergent.

We claim:

1. A method of applying a design to a substrate comprising the steps of:

(a) applying the design to a flexible carrier sheet;

(b) applying to the surface of said design a thermoplastic polymer containing layer of a heat sensitive adhesive polymer which contains a liquid component to reduce the adhesive bond between the design and the carrier sheet;

(c) placing the composite thus formed with the adhesive layer in contact with the substrate;

(d) applying heat and pressure to the carrier sheet to cause adhesion thereof and transference of the design to the substrate; and (e) thereafter peeling off the carrier sheet to reveal the design.

2. A method as claimed in claim 1, in which the design is in the form of a printing ink which includes a proportion of a thermoplastic polymer which softens at elevated temperatures.

3. A method as claimed in claim 1, in which said heat sensitive adhesive layer includes a proportion of a plasticising agent and/or a volatile solvent.

4. A method as claimed in claim 1, in which a pigment is added to the adhesive layer to intensify the design upon transference thereof to the substrate.

5. A transfer sheet comprising a flexible carrier sheet provided with a dry ink design, and having a thermoplastic polymer containing layer of a heat sensitive adhesive polymer containing a liquid component applied over said design which polymer layer serves to reduce the adhesive bond of the design relative to the carrier sheet, the composite thus formed being arranged to be applied to a textile material by application of heat and pressure whereupon the carrier sheet is removed from the textile material.

* * * * *